(12) United States Patent
Makido et al.

(10) Patent No.: US 10,170,865 B2
(45) Date of Patent: Jan. 1, 2019

(54) SHIELDED ELECTRIC WIRE CONNECTION STRUCTURE

(71) Applicants: TOYOTA JIDOSHA KABUSHIKI KAISHA, Toyota-shi, Aichi-ken (JP); SUMITOMO WIRING SYSTEMS, LTD., Yokkaichi-shi, Mie-ken (JP); AUTONETWORKS TECHNOLOGIES, LTD., Yokkaichi-shi, Mie-ken (JP); SUMITOMO ELECTRIC INDUSTRIES, LTD., Osaka-shi, Osaka (JP)

(72) Inventors: Yasuhiro Makido, Toyota (JP); Yousuke Kurono, Okazaki (JP); Haruki Kusamaki, Okazaki (JP); Tetsuya Iida, Yokkaichi (JP); Junpei Nakamoto, Yokkaichi (JP); Takuya Tate, Yokkaichi (JP); Hiroyuki Matsuoka, Yokkaichi (JP); Kouji Fukumoto, Yokkaichi (JP); Daisuke Hashimoto, Yokkaichi (JP); Toshiya Hirooka, Yokkaichi (JP)

(73) Assignees: TOYOTA JIDOSHA KABUSHIKI KAISHA, Toyota-shi, Aichi-ken (JP); SUMITOMO WIRING SYSTEMS, LTD., Yokkaichi-Shi, Mie-Ken (JP); AUTONETWORKS TECHNOLOGIES, LTD., Yokkaichi-Shi, Mie-Ken (JP); Sumitomo Electric Industries, Ltd., Chuo-Ku, Osaka (JP)

( * ) Notice: Subject to any disclaimer, the term of this patent is extended or adjusted under 35 U.S.C. 154(b) by 0 days.

(21) Appl. No.: 15/541,508

(22) PCT Filed: Oct. 16, 2015

(86) PCT No.: PCT/JP2015/079256
§ 371 (c)(1),
(2) Date: Jul. 5, 2017

(87) PCT Pub. No.: WO2016/111070
PCT Pub. Date: Jul. 14, 2016

(65) Prior Publication Data
US 2018/0019549 A1   Jan. 18, 2018

(30) Foreign Application Priority Data

Jan. 7, 2015  (JP) ................. 2015-001770
Aug. 31, 2015  (JP) ................. 2015-170198

(51) Int. Cl.
*H01R 13/6582* (2011.01)
*H01R 13/648* (2006.01)
(Continued)

(52) U.S. Cl.
CPC .......... *H01R 13/6582* (2013.01); *B60L 11/14* (2013.01); *H01R 13/5205* (2013.01);
(Continued)

(58) Field of Classification Search
CPC .................................. H01R 13/6582
(Continued)

(56) References Cited

U.S. PATENT DOCUMENTS 8,827,747 B2 * 9/2014 Tanaka ............... H01R 13/6581
439/607.27
2010/0243321 A1 * 9/2010 Adachi ................. B60L 3/0007
174/74 R
(Continued)

FOREIGN PATENT DOCUMENTS

CN  103959573 A  7/2014
JP  52-094194 U  7/1977
(Continued)

Primary Examiner — Tulsidas C Patel

*Assistant Examiner* — Peter G Leigh
(74) *Attorney, Agent, or Firm* — Sughrue Mion, PLLC

(57) ABSTRACT

The electric shielded wire connection structure includes: a lower side case that accommodates a rotary electric machine; an upper side case that is positioned immediately above, and facing, the lower side case and accommodates an inverter; a plurality of electric wires that is arranged in a state where one end thereof is connected to a lower side terminal block immediately under the upper side case, the other end thereof is connected to an upper side terminal block at a wall surface side end part of the upper side case, and the plurality of electric wires is bent from the position immediately under the upper side case so as to face the wall surface; and a braided shielding member that shields the plurality of electric wires and is arranged for the plurality of electric wires only at the side opposite to the surface facing the upper side case.

7 Claims, 11 Drawing Sheets

(51) Int. Cl.

| | | |
|---|---|---|
| *H01R 13/52* | (2006.01) | |
| *H01R 13/6593* | (2011.01) | |
| *H01R 24/52* | (2011.01) | |
| *B60L 11/14* | (2006.01) | |
| *H01R 13/627* | (2006.01) | |
| *H01R 103/00* | (2006.01) | |

(52) U.S. Cl.
CPC ....... *H01R 13/5216* (2013.01); *H01R 13/648* (2013.01); *H01R 13/6593* (2013.01); *H01R 24/52* (2013.01); *H01R 13/627* (2013.01); *H01R 2103/00* (2013.01); *H01R 2201/26* (2013.01)

(58) Field of Classification Search
USPC ...................................... 439/607.41; 174/350
See application file for complete search history.

(56) References Cited

U.S. PATENT DOCUMENTS

| | | | |
|---|---|---|---|
| 2013/0065405 A1* | 3/2013 | Tsuchiya ............ | H01R 13/6581 439/34 |
| 2014/0051282 A1 | 2/2014 | Tanaka et al. | |
| 2014/0202756 A1* | 7/2014 | Adachi ............... | B60R 16/0215 174/377 |
| 2014/0202762 A1* | 7/2014 | Adachi .............. | H01R 13/6599 174/72 A |
| 2014/0202763 A1* | 7/2014 | Adachi ................ | H01R 13/504 174/72 A |
| 2014/0216805 A1* | 8/2014 | Adachi .................. | H01B 7/182 174/350 |
| 2014/0216812 A1* | 8/2014 | Adachi ............... | B60R 16/0215 174/72 A |
| 2014/0238735 A1* | 8/2014 | Adachi .................... | H01R 4/20 174/351 |
| 2014/0318852 A1* | 10/2014 | Adachi ................ | H01R 13/648 174/350 |
| 2015/0027772 A1 | 1/2015 | Hashimoto et al. | |
| 2015/0107871 A1* | 4/2015 | Adachi ............... | B60R 16/0215 174/102 C |
| 2015/0187469 A1* | 7/2015 | Inao ..................... | H02G 3/0481 29/863 |

FOREIGN PATENT DOCUMENTS

| | | |
|---|---|---|
| JP | 2013-012457 A | 1/2013 |
| JP | 2013-059238 A | 3/2013 |
| JP | 2013-115071 A | 6/2013 |
| JP | 2013-176279 A | 9/2013 |
| JP | 2014-073811 A | 4/2014 |
| WO | 2012039490 A2 | 3/2012 |

\* cited by examiner

OPPOSING UPPER CASE SIDE

SHIELDED ELECTRIC WIRE CONNECTION STRUCTURE

CROSS REFERENCE TO RELATED APPLICATIONS

This application is a National Stage of International Application No. PCT/JP2015/079256, filed Oct. 16, 2015, claiming priority based on Japanese Patent Application Nos. 2015-001770, filed Jan. 7, 2015 and 2015-170198, filed Aug. 31, 2015, the contents of all of which are incorporated herein by reference in their entirety.

TECHNICAL FIELD

The present invention relates to a shielded electric wire connecting structure including a lower case which has a lower terminal base and houses a rotary electric machine, an upper case which has an upper terminal base and houses an inverter, a plurality of electric wires connected to the lower terminal base and the upper terminal base, and a braided shield component.

BACKGROUND

Conventionally, a plurality of electric wires have been used for connecting a rotary electric machine and an inverter. The plurality of electric wires may be assembled in some instances into a collective electric wire member.

Patent Literature 1 describes that a lower case houses a rotary electric machine, an inverter is housed in an upper case which is secured to the lower case directly above the lower case, and the upper case and the lower case are connected to connectors of a collective electric wire member.

Patent Literature 2 describes that a collective electric wire member used for connecting a rotary electric machine and an inverter is formed as a shielded electric wire component by collectively covering circumferences of electric wires with a braided shield component formed in the shape of a sleeve.

CITATION LIST

Patent Literature

Patent Literature 1: JP 2014-073811 A
Patent Literature 2: JP 2013-115071 A

SUMMARY

Technical Problem

In the structure disclosed in Patent Literature 2, the braided shield component is connected to an upper case and a lower case having electrical conductivity via connectors on both ends of the shielded electric wire component, to implement a shield structure for preventing electromagnetic waves. In this structure, however, because the sleeve-shaped braided shield component is arranged around the collective electric wire member, there is a possibility that the shielded electric wire component cannot be bent along a desired direction.

On the other hand, in the structure described in Patent Literature 1, the upper case is secured directly above the lower case, and the connector on one end of the collective electric wire member is connected to the lower case in a small space directly below the upper case. Further, it is necessary that the collective electric wire member should be greatly bent in order to connect the connector on the other end of the collective electric wire member to a terminal base on a wall surface side of the upper case. This may raise a risk that work efficiency in installation is deteriorated in the structure described in Patent Literature 1 when circumferences of a plurality of electric wires are collectively covered by the braided shield component. Particularly, in a case where the braided shield component is covered so as to collectively surround all the circumferences of the plurality of electric wires placed in a line, an area of the braided shield component is increased. As a result of this, it becomes difficult to bend the shielded electric wire component along a desired direction, which may result in deteriorated work efficiency in installation. Further, there is room for improvement in terms of costs for the structure in which the circumferences of the plurality of electric wires are collectively covered by the braided shield component.

An object of the present invention is to provide a shielded electric wire connecting structure including a plurality of electric wires placed in a state of being bent from a position directly below an upper case to a position opposed to a wall surface of the upper case, the shielded electric wire connecting structure being capable of contributing to improved work efficiency in installation and reduced costs.

Solution to Problem

A shielded electric wire connecting structure according to the present invention includes a lower case that has a lower terminal base and houses a rotary electric machine, an upper case that has an upper terminal base and houses an inverter, the upper case being disposed directly above the lower case so as to be opposed to the lower case, a plurality of electric wires whose one ends are connected to the lower terminal base directly below the upper case while the other ends are connected to the upper terminal base at an end portion on a surface side of a wall of the upper case, the plurality of electric wires being placed in a state of being bent from a position directly below the upper case to a position opposed to the wall, and a braided shield component that is placed to shield the plurality of electric wires only on an opposite side of the plurality of electric wires from a face thereof opposed to the upper case.

According to the shielded electric wire connecting structure of the present invention, the structure, which includes the plurality of electric wires placed in the state of being bent from the position directly below the upper case to the position opposed to the wall, can be easily bent along a desired direction, and an area of the braided shield component can be minimized. In this way, work efficiency in installation can be improved while costs can be reduced.

Preferably, in the shielded electric wire connecting structure according to the present invention, the braided shield component includes a plurality of warp sections, which have electrical conductivity and extend along the plurality of electric wires so as to be coupled to a first fastening member formed of an electrically conductive material and fixed to the upper case and a second fastening member formed of an electrically conductive material and fixed to the lower case, and a weft member, which is formed of a resin material and woven across the plurality of warp sections while intersecting each other. Further, in this structure, the weft member has a tensile strength per unit cross sectional area higher than that of a weft member formed of copper.

According to the above-described preferable configuration, the tensile strength of the weft member becomes higher, while electromagnetic wave shielding properties are not affected by electrical conductivity of the weft member. Because the tensile strength is increased, a speed of braiding the braided shield component can be increased. In addition, material costs of the weft member can be reduced. In this way, improved strength of the braided shield component and reduced costs can both be realized without incurring deterioration in the electromagnetic wave shielding properties.

Preferably, in the shielded electric wire connecting structure according to the present invention, the plurality of electric wires whose one ends are coupled to a lower connector while the other ends are coupled to an upper connector constitute a combined electric wire component, the lower connector is fixed to the lower case, the upper connector is fixed to the upper case, and both ends of the braided shield component are connected to the lower connector and the upper connector.

According to the above-described preferable configuration, both ends of the braided shield component are coupled via the lower connector and the upper connector to the lower case and the upper case. This can eliminate a necessity to secure a longitudinal middle portion of the braided shield component to the plurality of electric wires for coupling the braided shield component to the lower case and to the upper case. For this reason, the braided shield component and the plurality of electric wires can be easily bent in a desired direction, which can, in turn, contribute to further improved work efficiency in installation.

Advantageous Effects of Invention

According to the shielded electric wire connecting structure of the present invention, improved work efficiency in installation and reduced costs can both be realized in the structure including the plurality of electric wires placed in the state of being bent from the position directly below the upper case to the position opposed to the wall surface of the upper case.

DESCRIPTION OF EMBODIMENTS

Figure 1A:
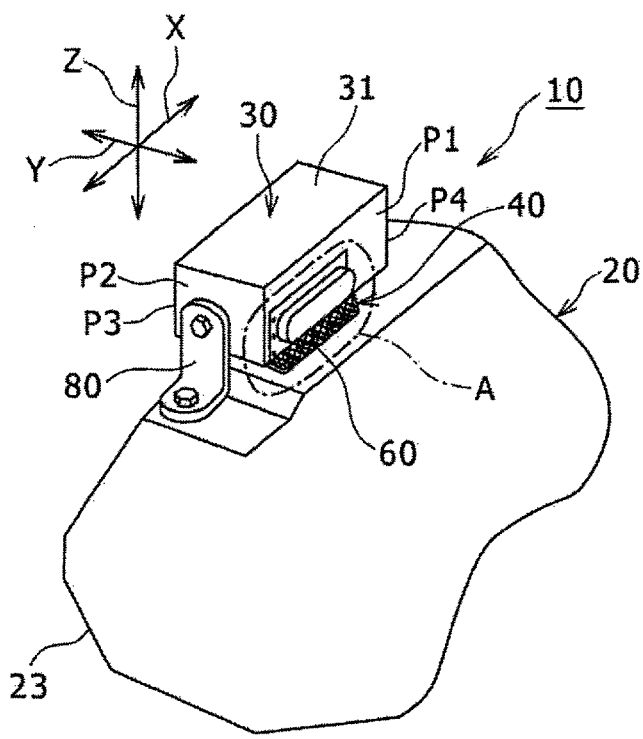
FIG. 1A A perspective view of a shielded electric wire connecting structure according to an embodiment of this invention.

Hereinafter, an embodiment according to the present invention will be described in detail with reference to drawings. In the following description, shapes of components, the number of components, and their other features are described by way of illustration, and may be changed depending on specifications of a device incorporating a shielded electric wire connecting structure. In the description below, similar components are identified by identical reference numerals, and descriptions related to these components will not be repeated. Although the shielded electric wire connecting structure will be explained below with reference to an example in which the shielded electric wire connecting structure is used for coupling a rotary electric machine and an inverter to drive a vehicle, the shielded electric wire connecting structure may be used for coupling a rotary electric machine and an inverter which are not intended to be used in a vehicle.

Figure 1B:
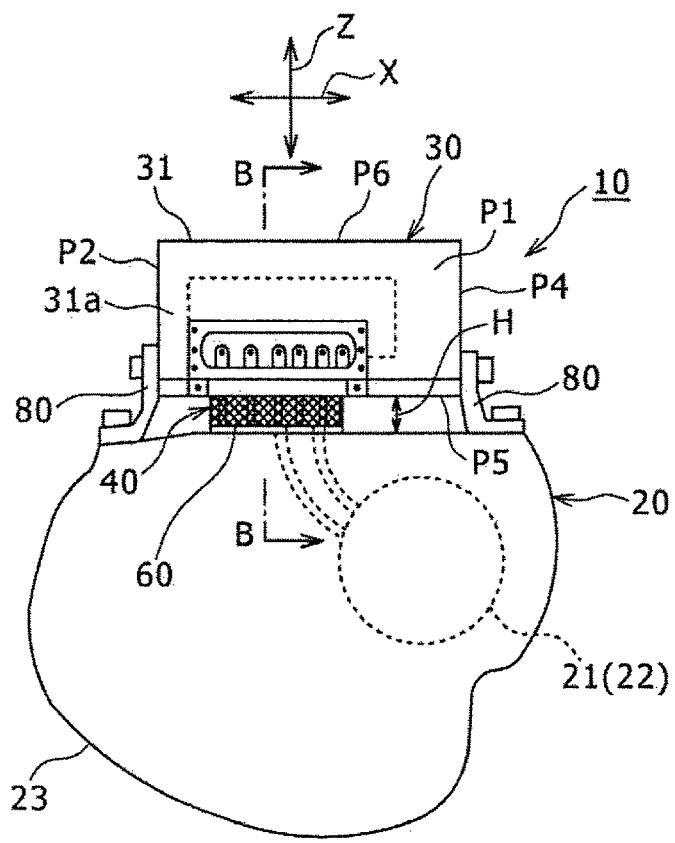
FIG. 1B A front view of the shielded electric wire connecting structure according to the embodiment of this invention.
Figure 2:
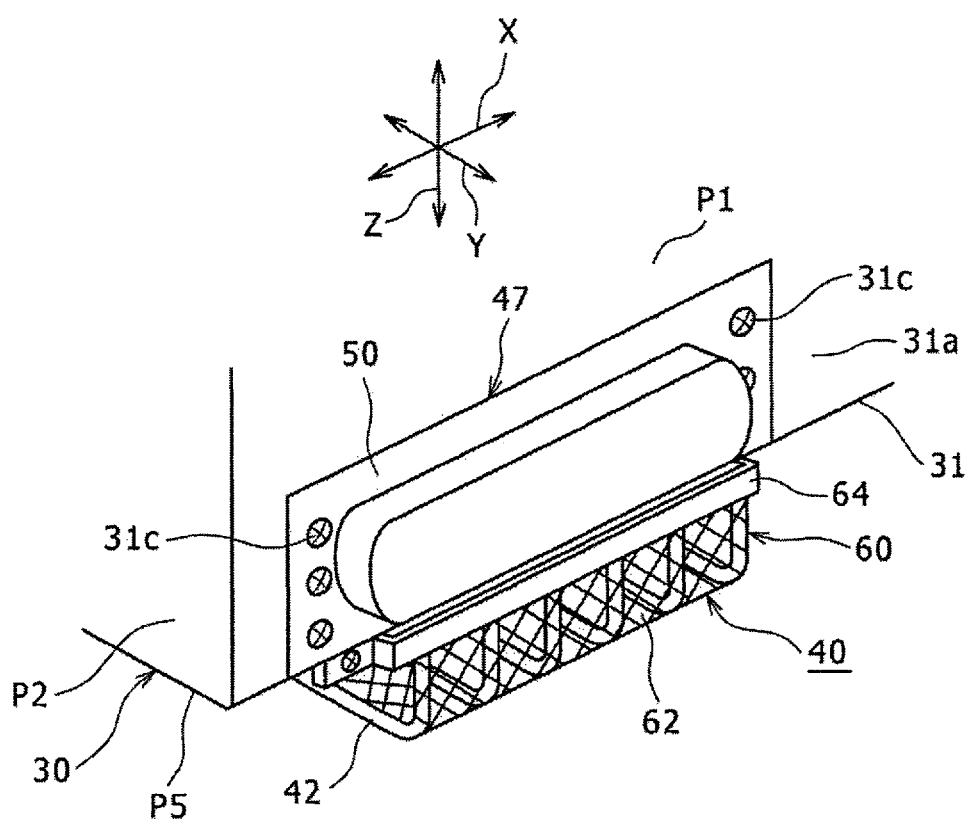
FIG. 2 An enlarged view showing a part A indicated in FIG. 1A.
Figure 3A:
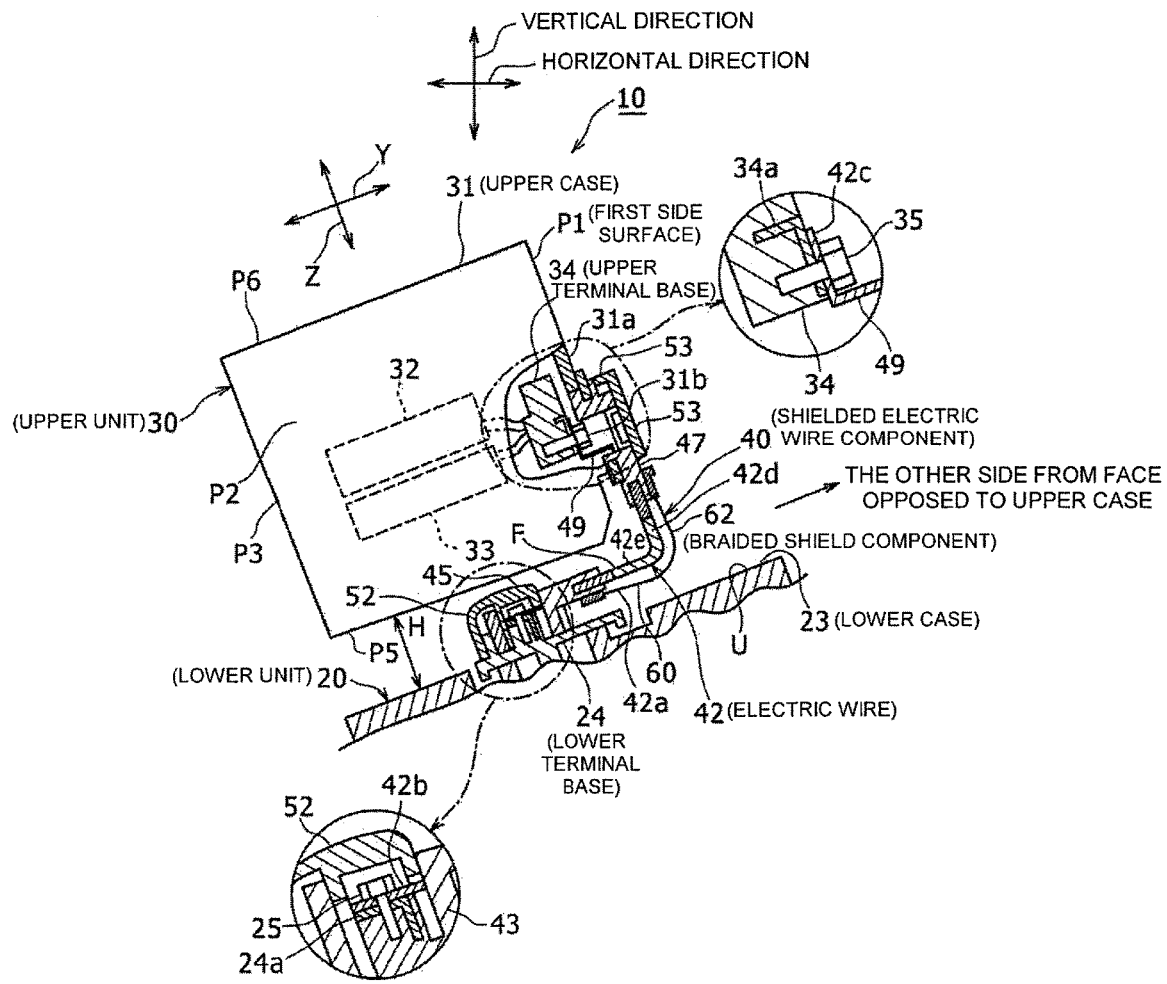
FIG. 3A A cross-sectional view taken along a line B-B indicated in FIG. 1B.
Figure 3B:
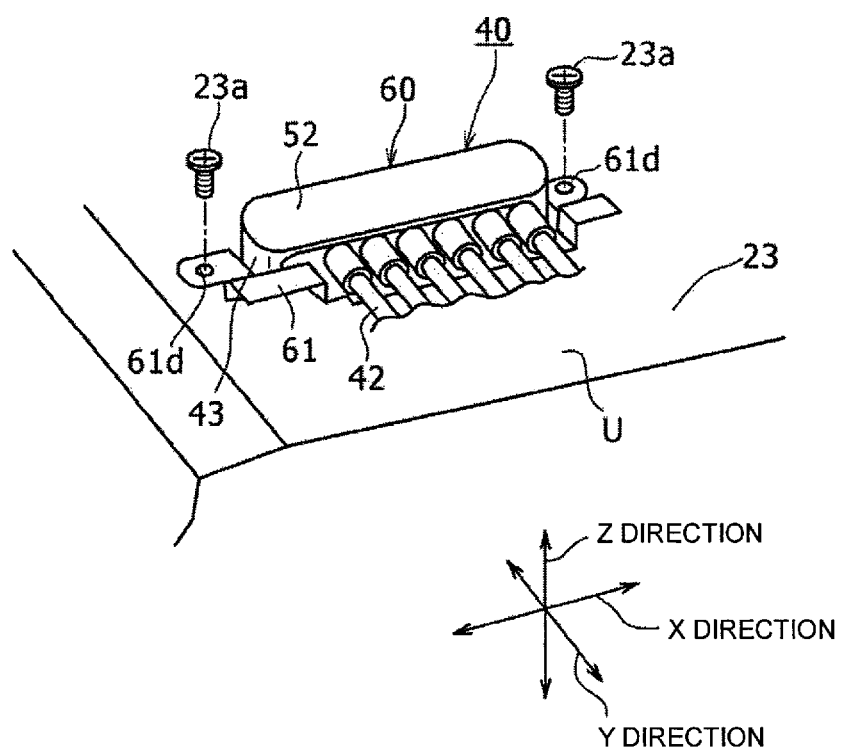
FIG. 3B A perspective view showing a state in which a lower connector is attached to a top surface of a lower case.

FIG. 1A is a perspective view of the shielded electric wire connecting structure in this embodiment, and FIG. 1B is a front view of the shielded electric wire connecting structure. FIG. 2 is an enlarged view of a part A indicated in FIG. 1A. FIG. 3A is a cross-sectional view taken along a line B-B indicated in FIG. 1B. FIG. 3B is a perspective view showing a lower connector 43 in a state attached to a top surface of a lower case 23. The shielded electric wire connecting structure 10 is hereinafter simply referred to as an "electric wire connecting structure 10".

The electric wire connecting structure 10 includes a lower unit 20, an upper unit 30, and a shielded electric wire component 40. The electric wire connecting structure 10 is formed of the lower unit 20 and the upper unit 30 connected to a plurality of electric wires 42 of the shielded electric wire component 40. The electric wire connecting structure 10 is mounted on a vehicle and used therein. The vehicle is a hybrid vehicle in which a not-illustrated engine and a motor 21 being a rotary electric machine are installed as a drive source of the vehicle. The vehicle may be any other electrically-driven vehicle, such as an electric vehicle or a fuel cell electric vehicle, as long as the vehicle is equipped with the rotary electric machine. In the description below, although an example in which the motor 21 being the rotary electric machine and a generator 22 being the rotary electric machine are electrically connected through the shielded electric wire component 40 to two inverters 32 and 33 (FIG. 3A) is described, the present embodiment may be applied to an arrangement in which the shielded electric wire component 40 is used for connecting only one rotary electric machine to a corresponding inverter.

The lower unit 20 includes the motor 21, the generator 22, a not-illustrated power dividing mechanism, the lower case 23, and a lower terminal base 24. The lower unit 20 is also referred to as a trans axle or T/A. The motor 21 and the generator 22 may be motor generators, each of which has the capability to function as both an electrically-powered motor and a generator.

The power dividing mechanism is connected in a position between the motor 21, the engine and the generator 22. The lower case 23 houses the motor 21, the generator 22, and the power dividing mechanism. The lower case 23 is composed of a metal having electrical conductivity, such as, for example, iron or an aluminum alloy. The power dividing mechanism is composed of, for example, a planetary gear mechanism. The lower case 23 is attached and secured via a bracket to a not-illustrated vehicle body constituting the vehicle.

Power from at least one of the engine and the motor 21 is passed through the power dividing mechanism to an axle which is not illustrated. When a vehicle wheel coupled to the axle is actuated, the vehicle is driven to travel.

As shown in FIG. 3A, the lower terminal base 24 is attached to an upper end portion of the lower case 23, such as, for example, a top surface U, and is equipped with six terminal fittings 24a (only one of which is illustrated in FIG. 3A) whose number corresponds to the number of electric wires 42 in the shielded electric wire member 40, which will be described below.

The motor 21 is a three-phase AC motor having a three-phase stator coil. The generator 22 is a three-phase AC generator having a three-phase stator coil. In each of the motor 21 and the generator 22, three power lines connected to corresponding ones of the three-phase stator coils are respectively connected to three corresponding terminal fittings 24a in the lower terminal base 24.

Referring back to FIGS. 1A and 1B, the upper unit 30 is fixed directly above the lower unit 20 to a position where the bottom surface of the upper unit 30 is opposed to the top surface of the lower unit 20. More specifically, the upper unit 30 includes an upper case 31 as described below. Then, two L-shaped brackets 80 placed on both sides of the upper unit 30 along a lateral direction (x direction in FIG. 1B) are used to fixedly couple wall surfaces of the upper case 31 to the top surface of the lower case 23. In this way, the upper case 31 is placed directly above the lower case 23 so as to be opposed to the lower case 23. In FIGS. 1A, 1B to 3A, and 3B, x, y, and z directions are defined. A top surface P6 of the upper case 31 is defined as a rectangular plane whose longitudinal direction is defined as the x direction and whose short-side direction is defined as the y direction, and a direction perpendicular to the rectangular plane is defined as the z direction. The x direction may be also referred to as the lateral direction.

As shown in FIG. 3A, the upper unit 30 includes the upper case 31, the first inverter 32, the second inverter 33, and an upper terminal base 34. The upper case 31 is composed of an electrically conductive metal, such as iron or an aluminum alloy, and formed in a shape of a substantially rectangular box. Although FIG. 3A shows the top surface P6 of the upper case 31, which is slightly inclined relative to the horizontal plane, the upper case 31 may be positioned with the top surface P6 aligned with a horizontal plane.

The first inverter 32 and the second inverter 33 shown in FIG. 3A include circuit boards equipped with, for example, switching elements, such as transistors, and diodes. The first inverter 32 is electrically coupled to a not-illustrated battery and the motor 21 (FIG. 1B), and functions to convert a direct current output from the battery into a three-phase alternating current and output the three-phase alternating current to a motor 21 side. The second inverter 33 is electrically connected to a battery and the generator 22, and functions to convert a three-phase alternating current generated in the generator 22 into a direct current and output the direct current to a battery side. When the engine is actuated, for example, power of the engine is partially transmitted through the power dividing mechanism to the generator for causing the generator to produce the three-phase alternating current.

The upper terminal base 34 (FIG. 3A) is attached to a plate part 31a which has, among a first wall surface P1, a second wall surface P2, a third wall surface P3, and a fourth wall surface P4 constituting external surfaces surrounding the periphery of the upper case 31, the first wall surface P1 oriented to face one end side (the right side in FIG. 3A) in the Y direction. The six terminal fittings 34a (only one of which is illustrated in FIG. 3A) are mounted on the upper terminal base 34. Three of the six terminal fittings 34a are connected to the corresponding first inverter 32. The remaining three other terminal fittings 34a are connected to the corresponding second inverter 33.

The terminal fittings 34a on the upper terminal base 34 are opposed to an opening 31b formed in the plate part 31a of the upper case 31. The upper case 31 may house components constituting a DC/DC converter.

The upper unit 30 is secured to the top side of the lower unit 20 without interposing the vehicle body between the upper unit 30 and the lower unit 20. In this way, it becomes possible to reduce a distance H (FIGS. 1B and 3A) between the upper unit 30 and the lower unit 20. Further, the upper unit 30 and the lower unit 20 are connected to the below-described shielded electric wire component 40. Because of this, the entire length of the shielded electric wire component 40 can be accordingly reduced.

Figure 4A:
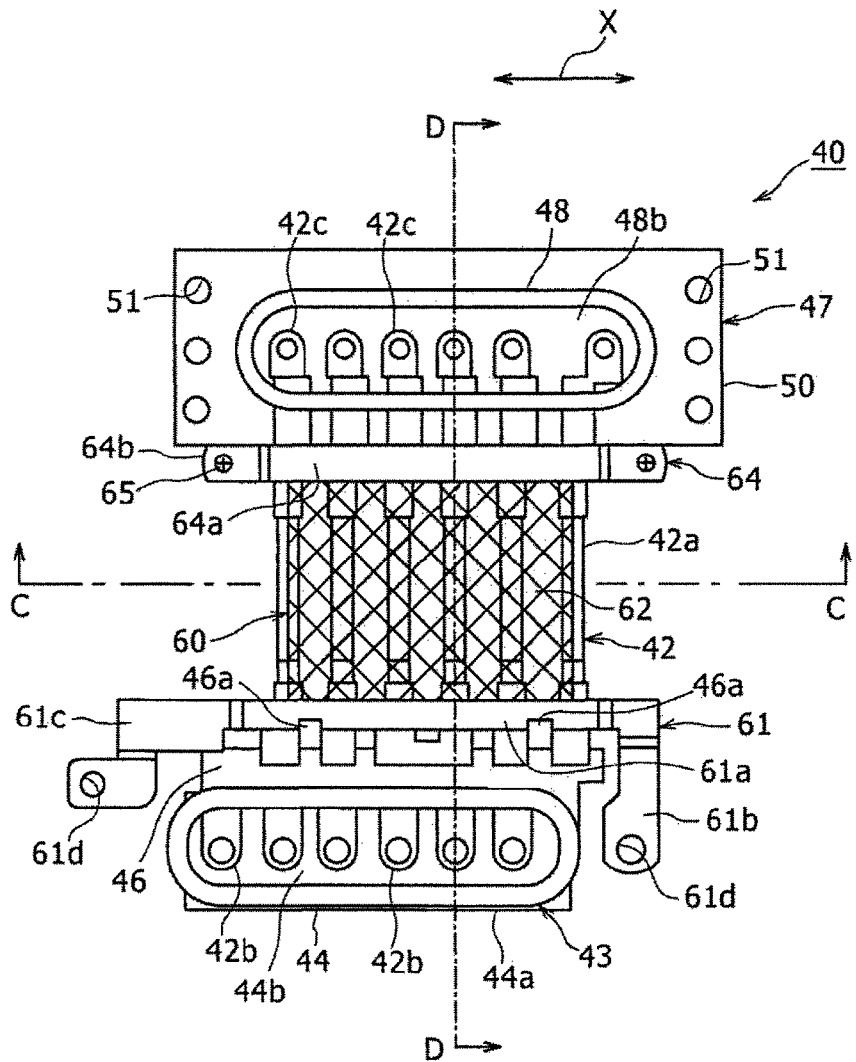
FIG. 4A A front view showing, in a position extended along a flat plane, a shielded electric wire component constituting the shielded electric wire connecting structure according to the embodiment of this invention.
Figure 4B:
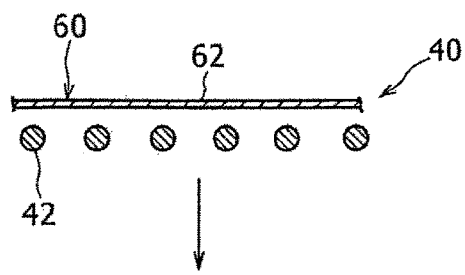
FIG. 4B A cross-sectional view taken along a line C-C indicated in FIG. 4A.
Figure 5:
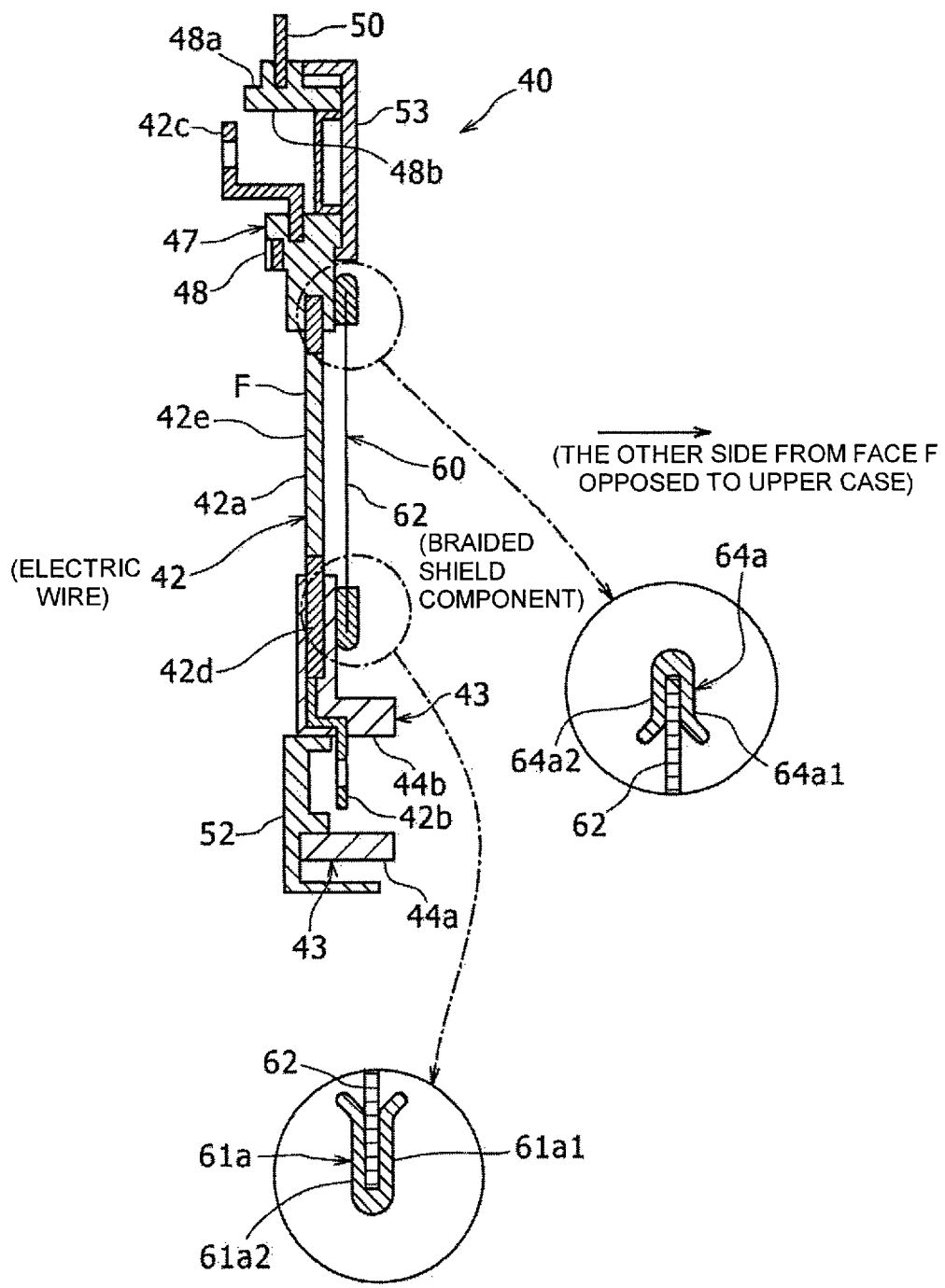
FIG. 5 A cross-sectional view taken along a line D-D indicated in FIG. 4A.
Figure 6A:
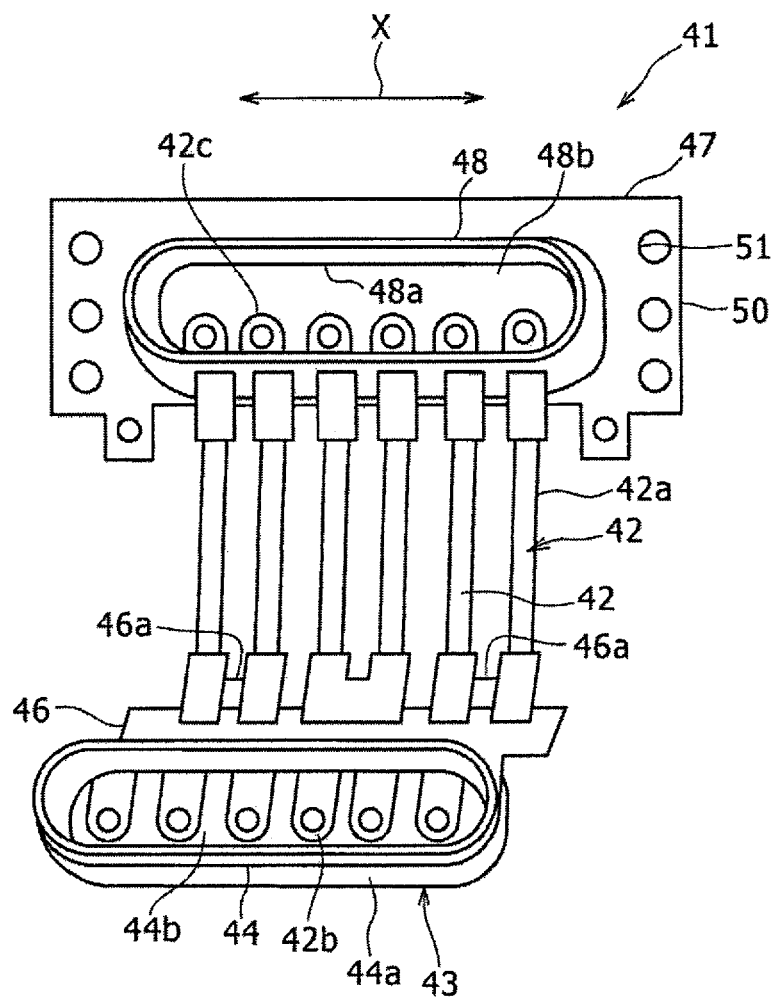
FIG. 6A A diagram showing a combined electric wire component constituting the shielded electric wire component.
Figure 6B:
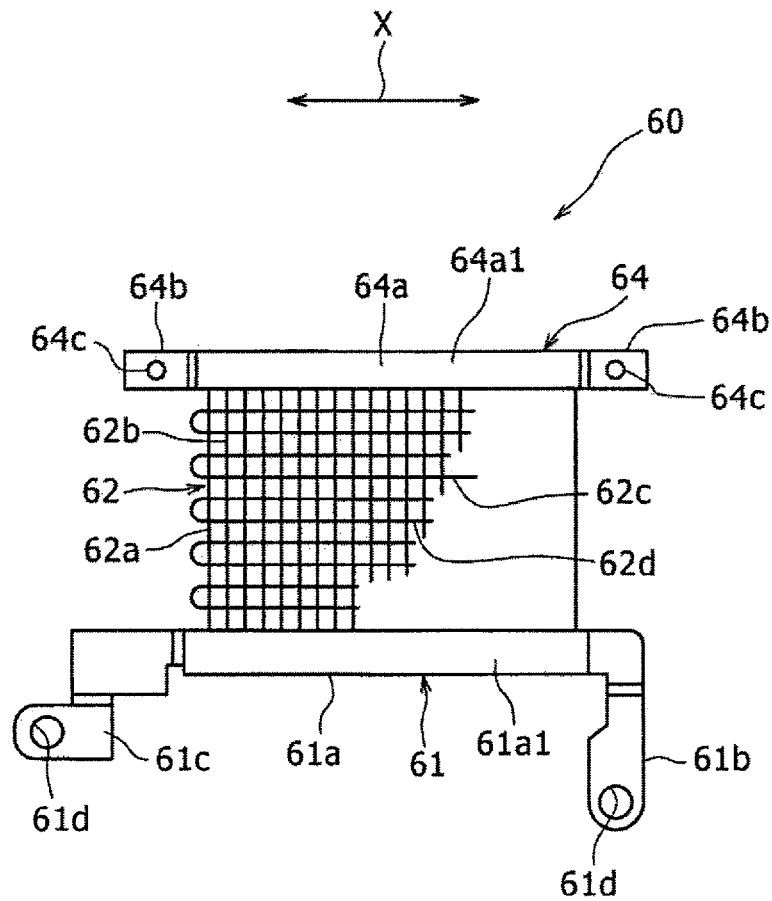
FIG. 6B A diagram showing a shield unit constituting the shielded electric wire component.

FIG. 4A is a front view showing, in a position extended along a flat plane, the shielded electric wire component 40 constituting the electric wire connecting structure 10. FIG. 4B is a cross sectional view taken along a line C-C in FIG. 4A. FIG. 5 is a cross sectional view taken along a line D-D in FIG. 4A. FIG. 6A shows a combined electric wire component 41 constituting the shielded electric wire component 40. FIG. 6B shows a shield unit 60 constituting the shielded electric wire component 40.

The shielded electric wire component 40 is composed of the combined electric wire component 41 (FIG. 6A) connected to the shield unit 60 (FIG. 6B) constituting an electromagnetic wave shielding structure. As shown in FIG. 6A, the combined electric wire component 41 includes multiple (6, in the illustrated example) electric wires 42, the lower connector 43, and the upper connector 47.

Each of the electric wires 42 is formed of an electric wire main body 42a with a first terminal fitting 42b and a second terminal fitting 42c connected to both ends of the electric wire main body 42a. Each electric wire main body 42a includes a conductor element wire 42d (FIG. 3A) formed of a highly conductive metal, such as copper or a copper alloy, and an insulating tube 42e formed of an insulating material. Each electric wire main body 42a is formed by covering the conductor element wire 42d except for both end portions thereof with the insulating tube 42e. A plurality of electric wire main bodies 42a are spaced apart from each other and placed in a line along the lateral direction (the x direction).

The lower connector 43 is connected in common to one end portion (the lower end portion in FIG. 6A) of each of the electric wire main bodies 42a. The lower connector 43 is used for coupling one ends of the electric wire main bodies 42a to the lower terminal base 24 attached to the lower case 23 (FIG. 3A). More specifically, the lower connector 43 includes a lower connector main body 44 formed of resin and a lower fastening metal fixture 46 (FIGS. 4A and 6A) resin-molded to the lower connector main body 44. The six first terminal fittings 42b, which are respectively connected to the six electric wire main bodies 42a, are partially resin molded to the lower connector main body 44. On one surface side (the right-hand side in FIG. 5 and a paper surface side in FIG. 6A) of the lower connector main body 44 opposed to the lower terminal base 24 (FIG. 3A) in an assembling time, a lower tube part 44a having an elliptical shape in cross section is protrudingly formed. An elliptically shaped through hole 44b is formed in an internal region of the lower tube part 44a.

As shown in FIG. 5, one end portion (an upper end portion in FIG. 5) of each of the first terminal fittings 42b is joined by caulking or other processing to an end portion (a lower end portion in FIG. 5) of the conductor element wire 42d (FIG. 5) exposed from the insulating tube 42e at one end portion (the lower end portion in FIG. 5) of a corresponding one of the electric wire main bodies 42a. In this way, the first terminal fittings 42b are electrically connected to the electric wire main bodies 42a. The other end portion of each of the first terminal fittings 42b on an opposite side from the electric wire main bodies 42a is projected into the through hole 44b in the lower tube part 44a so as to be connectable with a power line that is coupled to the motor 21 (FIG. 1B) or the generator 22 (FIG. 1B).

As shown in FIGS. 4A and 6A, the lower fastening metal fixture 46 of the lower connector 43 is resin-molded onto the lower tube part 44a of the lower connector main body 44 or onto a region around the lower tube part 44a. In FIG. 5, the lower fastening metal fixture 46 is not illustrated in the drawing.

Further, in the lower fastening metal fixture 46, two caulking parts 46a are formed on an end edge portion (an upper end edge portion in FIGS. 4A and 6B) on a lower bracket 61 side of the below-described shield unit 60 (FIG. 6B). Each of the caulking parts 46a is formed of a region of the lower fastening metal fixture 46 protruded from its end edge (the upper end edge in FIGS. 4A and 6B) on a lower bracket 61 side, by bending the protruded region so as to have the shape of a letter L in cross section. The tip end of each of the caulking parts 46a is caulk-fixed to an end portion (a lower end portion in FIGS. 4A and 6B) of a below-described lower U-shaped part 61a (FIGS. 4A and 6B) of the lower bracket 61. In this way, the lower bracket 61 is fixed to the lower fastening metal fixture 46.

As shown in FIGS. 4A and 6A, the upper connector 47 is connected in common to the other end portion (the upper end portion in FIGS. 4A and 6A) of each of the electric wire main bodies 42a. The upper connector 47 is used for coupling the other ends of the electric wire main bodies 42a to the upper terminal base 34 attached to the upper case 31 (FIG. 3A). More specifically, the upper connector 47 includes an upper connector main body 48 formed of resin and an upper metal plate 50 resin-molded to the upper connector main body 48. The six second terminal fittings 42c, which are respectively connected to the six electric wire main bodies 42a, are partially resin-molded to the upper connector main body 48. On the other surface side (the left-hand side in FIG. 5, the paper undersurface side in FIG. 6A) of the upper connector main body 48 opposed to the upper terminal base 34 (FIG. 3A), an upper tube part 48a having an elliptical shape in cross section is protrudingly formed. An elliptically shaped through hole 48b is formed in the upper tube part 48a.

As shown in FIG. 5, one end portion (a lower end portion in FIG. 5) of each of the second terminal fittings 42c is joined, in an area not-illustrated in FIG. 5, by caulking or other processing to an end portion of the conductor element wire 42d (FIG. 3A) exposed from the insulating tube 42e at the other end portion (the upper end portion in FIG. 5) of a corresponding one of the electric wire main bodies 42a. In this way, the second terminal fittings 42c are electrically connected to the electric wire main bodies 42a. The other end portion of each of the second terminal fittings 42c on an opposite side from the electric wire main bodies 42a is projected into the through hole 48b in the upper tube part 48a so as to be connectable with the corresponding inverter 32 (or 33) (FIG. 3A).

As shown in FIG. 4A, the upper metal plate 50 is screw-fixed to an upper bracket 64 of the below-described shield unit 60 (FIGS. 4A and 6B) by means of screws 65 (FIG. 4A). Holes 51 used for inserting the screws 65 into the upper case 31 are respectively formed in both end portions of the upper metal plate 50 along the x direction.

As shown in FIG. 6B, the shield unit 60 includes a braided shield component 62, the lower bracket 61, and the upper bracket 64. The lower bracket 61 is joined to one end portion (a lower end portion in FIG. 6B) of the braided shield component 62, while the upper bracket 64 is joined to the other end portion (an upper end portion in FIG. 6B) of the braided shield component 62. The braided shield component 62 is formed by braiding extra fine metal wires having electrical conductivity, such as, for example, tin-plated annealed copper wires, into a plain weave. In FIGS. 1A, 1B, 2, and 4A, the braided shield component 62 is depicted with an oblique lattice for the sake of clarifying positional relationships. Meanwhile, in practice, the braided shield component 62 includes, as shown in FIG. 6B, a first metal wire 62b and a second metal wire 62d. The first metal wire 62b is a corrugated warp member including a plurality of longitudinal sections 62a being warp sections arranged along a longitudinal direction (the vertical direction in FIG. 6B). The second metal wire 62d is a corrugated weft member including a plurality of lateral sections 62c being weft sections arranged along the lateral direction. The lateral sections 62c intersect the longitudinal sections 62a so as to be substantially orthogonal to each other. Then, the braided shield component 62 is formed by weaving one of the first metal wire 62b and the second metal wire 62d across the other of the metal wires 62b and 62d. For example, the second metal wire 62d is woven across the plurality of longitudinal sections 62a while intersecting each other. Further, one of the first metal wire 62b and the second metal wire 62d may be woven across the other of the first and second metal wires 62b and 62d using a braiding machine (not illustrated). Electrically conductive resin element wires may be used in place of the metal wires constituting the braided shield component 62. The plurality of electric wires 42 are shielded with the braided shield component 62 configured as described above. Specifically, the braided shield component 62 opposed to the plurality of electric wire main bodies 42a is configured to suppress radiation noise in electromagnetic waves that are output from the electric wires 42 being emitted to the outside.

The lower bracket 61 is formed of a metal plate and equipped with the lower U-shaped part 61a placed in an intermediate region and two lower fastening members 61*b* and 61*c* joined to both ends of the lower U-shaped part 61*a*. As shown in FIG. 5, the lower U-shaped part 61*a* is formed by folding the metal plate in the shape of a letter U, and coupled to the braided shield component 62 by inserting and holding one end portion (the lower end portion in FIG. 5) of the braided shield component 62 within the U shape. In this way, the one end portion of the braided shield component 62 is coupled to the lower bracket 61. As shown in FIGS. 5 and 6B, each of the lower fastening members 61*b* and 61*c* is formed by extending both lateral (x-direction) ends of a plate part 61*a*1, which is one of two opposing plate parts 61*a*1 and 61*a*2 that constitute the lower U-shaped part 61*a*, so as to be longer than both lateral ends of the other plate part 61*a*2 and bending the extended ends of the plate part 61*a*1. A hole 61*d* (FIG. 6B) used for screw fixation to the lower case 23 is formed in a tip end portion of each of the lower fastening members 61*b* and 61*c*.

The upper bracket 64 is formed of a metal plate and equipped with the upper U-shaped part 64*a* placed in an intermediate region and two upper fastening members 64*b* joined to both ends of the upper U-shaped part 64*a*. As shown in FIG. 5, the upper U-shaped part 64*a* is formed by folding the metal plate in the shape of a letter U, and coupled to the braided shield component 62 by inserting and holding the other end portion (the upper end portion in FIG. 5) of the braided shield component 62 within the U shape. In this way, the other end portion of the braided shield component 62 is coupled to the upper bracket 64. As shown in FIGS. 5 and 6B, each of the upper fastening members 64*b* is formed by extending both lateral (x-direction) ends of a plate part 64*a*1, which is one of two opposing plate parts 64*a*1 and 64*a*2 that constitute the upper U-shaped part 64*a*, so as to be longer than both lateral ends of the other plate part 64*a*2 and bending the extended ends of the plate part 64*a*1. A hole 64*c* (FIG. 6B) used for screw fixation to the upper metal plate 50 is formed in a tip end portion of each of the upper fastening members 64*b*. The lower bracket 61 and the upper bracket 64 are formed, for example, of a cold rolled steel sheet provided with conductive plating.

In the shield unit 60 structured as described above, the caulking parts 46*a* formed in some regions of the lower fastening metal fixture 46 are fixed, as shown in FIG. 4A, by caulking to an end portion (the lower end portion in FIG. 4A) on a folded back side of the lower U-shaped part 61*a*. In this way, one end portion (the lower end portion in FIG. 4A) of the shield unit 60 is fixed to the lower connector 43. Meanwhile, each of the upper fastening parts 64*b* in the shield unit 60 is coupled by means of the screw 65 to the upper metal plate 50 of the upper connector 47 in the combined electric wire component 41. The upper fastening parts 64*b* may be coupled to the upper metal plate 50 using bolts and nuts. In this way, the other end portion (the upper end portion in FIG. 4A) of the shield unit 60 is fixed to the upper connector 47. Thus, both of the end portions of the shield unit 60 are coupled to the combined electric wire component 41. Further, as shown in FIG. 5, the braided shield component 62 is solely arranged on one side of the plurality of electric wires 42 (on the right-hand side in FIG. 5).

A caulking part may be formed in an end edge portion (the lower end portion in FIG. 6A) on an upper bracket 64 side of the upper metal plate 50, and the upper U-shaped part 64*a* in the shield unit 60 may be coupled through the formed caulking part to the upper metal plate 50.

Referring back to FIG. 3B, the lower bracket 61 of the shield unit 60 is secured by screwing screws 23*a* into not-illustrated tapped holes formed in the upper end portion of the lower case 23. As a result of this, one end portion of the shielded electric wire component 40 is fixed to the lower case 23.

Referring back to FIG. 2, the upper metal plate 50 of the upper connector 47 is secured by screwing screws 31*c* into not-illustrated tapped holes formed in an end portion of the upper case 31 on a first wall surface P1 side. As a result of this, the other end portion of the shielded electric wire component 40 is fixed to the upper case 31.

Further, as shown in FIG. 3A, each of the first terminal fittings 42*b* fixed to the lower connector 43 is coupled to a corresponding one of the terminal fittings 24*a* of the lower terminal base 24 using a bolt 25. This allows one ends of the electric wires 42 to be connected to the lower terminal base 24 directly below the upper case 31. In this state, a lower cover 52 is put over the lower connector 43 to cover a coupling region of the terminal fittings 42*b* and 24*a*. In FIGS. 4A and 6A, diagrams are shown in a state where the lower cover 52 is removed.

Each of the second terminal fittings 42*c* fixed to the upper connector 47 is coupled to a corresponding one of the terminal fittings 34*a* of the upper terminal base 34 using a bolt 35. This allows the other ends of the electric wires 42 to be connected to the upper terminal base 34 in the end portion of the upper case 31 on the first wall surface P1 side. In this state, an upper cover 53 is put over the upper connector 47 to cover a coupling region of the terminal fittings 49 and 34*a*. In FIGS. 1B, 4A, and 6A, diagrams are shown in a state where the upper cover 53 is removed.

Under a condition that the electric wires 42 are coupled to the terminal bases 24 and 34 in the lower case 23 and the upper case 31 as described above, the braided shield component 62 is connected via the upper bracket 64 and the upper metal plate 50 to the upper case 31. The upper bracket 64 and the upper metal plate 50 constitute a first fastening member formed of an electrically conductive material.

In addition, the braided shield component 62 is connected via the lower bracket 61 to the lower case 23. The lower bracket 61 corresponds to a second fastening member formed of an electrically conductive material. In this way, the electromagnetic wave shielding structure is formed. It should be noted that the shielded electric wire component 40 is bent from a position directly below the upper unit 30 to a position opposed to the first wall surface P1 and placed in the bent state. In this state, the braided shield component 62 is placed only on an opposite side of the electric wires 42 from the face F (FIGS. 3A and 5) which is opposed to a bottom surface P5 and the first wall surface P1 of the upper case 31. Further, the longitudinal sections 62*a* (FIG. 6B) of the braided shield component 62 are placed so as to be substantially parallel to arrangement paths of the electric wires 42. Accordingly, the braided shield component 62 extends along the electric wires 42.

According to the above-described arrangement, the electromagnetic wave shielding structure including the braided shield component 62 can function to reduce electromagnetic wave noise, which is radiation noise of electromagnetic waves generated in each of the electric wires 42. There are two types of electromagnetic wave noise, one of which is emitted from the electric wires 42 themselves as electromagnetic waves generated by three-phase alternating currents for the motor 21 and the generator 22. This type of electromagnetic wave noise exerts an influence on vehicle accessories, such as, for example, a radio set. The other type of electromagnetic wave noise is generated based on switching of the inverters 32 and 33. This type of noise based on the switching of the inverters 32 and 33 is referred to as conduction noise. The conduction noise is created as radiation noise throughout a circuit for connecting in order of the inverter 32 (or 33)→electric wires 42→motor 21 (or generator 22)→electric wires 42→inverter 32 (or 33). The above-described two types of noise are mixedly created. In this embodiment, the above-described two types of noise can both be reduced.

Figure 7:
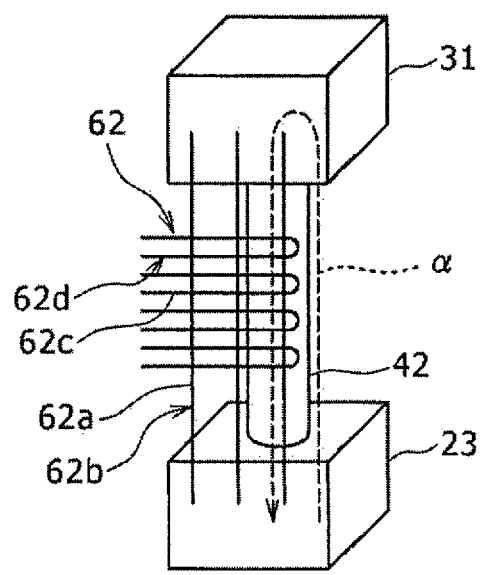
FIG. 7 A schematic diagram showing a situation where an electromagnetic shielding structure suppresses electromagnetic wave noise from being affected to the outside in the embodiment of this invention.

FIG. 7 is a schematic diagram showing a state where the electromagnetic wave shielding structure suppresses an influence of the electromagnetic wave noise from being exerted on the outside. In FIG. 7, the upper case 31 and the lower case 23 are schematically shown as rectangular solids. Further, a single electric wire 42 schematically shown in a straight shape is connected to the upper case 31 and the lower case 23. The braided shield component 62 is disposed on one side (a paper surface side in FIG. 7) of the electric wire 42. Both ends of each of the longitudinal sections 62a constituting the first metal wire 62b of the braided shield component 62 are connected to the upper case 31 and the lower case 23. One of the longitudinal sections 62a of the first metal wire 62b and the lateral sections 62c of the second metal wire 62d are woven across the other of the longitudinal sections 62a and the lateral sections 62c.

As noise currents flowing through the electric wire 42, there may be, for example, a noise current that flows through the electric wire 42 from a lower case 23 side toward an upper case 31 side as shown by a broken line arrow a in FIG. 7. Meanwhile, the longitudinal sections 62a are connected to both the upper case 31 and the lower case 23. Further, a ground of a circuit (not shown) contained in the lower case 23 is connected to the lower case 23, and a ground of a circuit (not shown) contained in the upper case 31 is connected to the upper case 31. This configuration causes the noise current that has flowed through the electric wire 42 in a direction along the broken line arrow a to further flow through the longitudinal sections 62a from the upper case 31 to the lower case 23 in a direction opposite to the direction of the noise current flowing through the electric wire 42. In this situation, the longitudinal sections 62a create feedback paths for the noise current. Accordingly, an electromagnetic field generated by the current flowing through the electric wire 42 can be cancelled by an electromagnetic field generated by the current flowing through the longitudinal sections 62a, which can, in turn, suppress electromagnetic noise from being emitted to the outside. Here, it is more preferable that one ends of the longitudinal sections 62a in the braided shield component 62 are connected to both the lower case 23 and the ground of the circuit contained in the lower case 23, while the other ends of the longitudinal sections 62a are connected to both the upper case 31 and the ground of the circuit contained in the upper case 31. This configuration facilitates formation of the feedback paths for the noise current in the braided shield component 62. For example, the lower bracket 61 (FIG. 6B) in the braided shield component 62 may be connected with a bolt or the like to the lower case 23 and the circuit ground contained in the lower case 23, while the upper bracket 64 (FIG. 6B) may be connected with a bolt or the like to the upper case 31 and the circuit ground contained in the upper case 31.

Further, according to the embodiment, the braided shield component 62 is placed only on the other side of the electric wires 42 from the face F which is opposed to the bottom surface P5 and the first wall surface P1 of the upper case 31. For this reason, even in a bent arrangement, the shielding electric wire component 40 can be easily bent and placed along a desired direction, as distinct from a case where a sleeve-shaped braided shield component is provided so as to surround the shielded electric wire component. In particular, when the plurality of electric wire main bodies 42a are arranged in a single line as described in the embodiment, a circumferential length surrounding the electric wires 42 is increased. Even in this case, easiness in operation to bend the shielded electric wire component 40 in a desired direction can be ensured according to the embodiment. This contributes to improved work efficiency in installation of the shielded electric wire component 40. Further, an area of the braided shield component 62 can be reduced, which can lead to cost reduction. As a result, improved work efficiency in installation of the electric wire connecting structure 10 and reduced costs can be both obtained.

Still further, because the distance H between the lower unit 20 and the upper unit 30 can be reduced as described above, it becomes possible to minimize the entire length of the shielding electric wire component 40. This allows the braided shield component 62 to have a practically sufficient capability of reducing the electromagnetic noise emitted to the outside even when the braided shield component 62 is provided only on one side of the electric wires 42 as described above.

It should be noted that although the arrangement of the upper terminal base 34 attached to the plate part including the first wall surface P1 of the upper case 31 has been described above, there is no limitation to a region of the upper case 31 to which the upper terminal base 34 is attached. Further, the upper terminal base 34 may be placed in the end portion of the upper case 31 on any one of the second wall surface P2, the third wall surface P3, and the fourth wall surface P4, and a placement position of the shielded electric wire component 40 may be changed depending on the placement of the upper terminal base 34.

As a comparative example, an arrangement is considered in which the braided shield component 62 is placed only on a surface side of the electric wires 42 opposed to the upper unit 30. Because, in the comparative example, it becomes necessary for the braided shield component 62 to be bent at a more acute angle, in the comparative example, there is plenty of scope for improvement in light of maintaining bendability of the braided shield component 62 along a desired direction. Moreover, on the surface side (an opposing side) of the electric wires 42 opposed to the upper unit 30, the electromagnetic wave noise created in the electric wires 42 is likely to be blocked by the upper unit 30. Because of this, the braided shield component 62 in the comparative example produces little effect in reducing the electromagnetic wave noise.

Figure 8A:
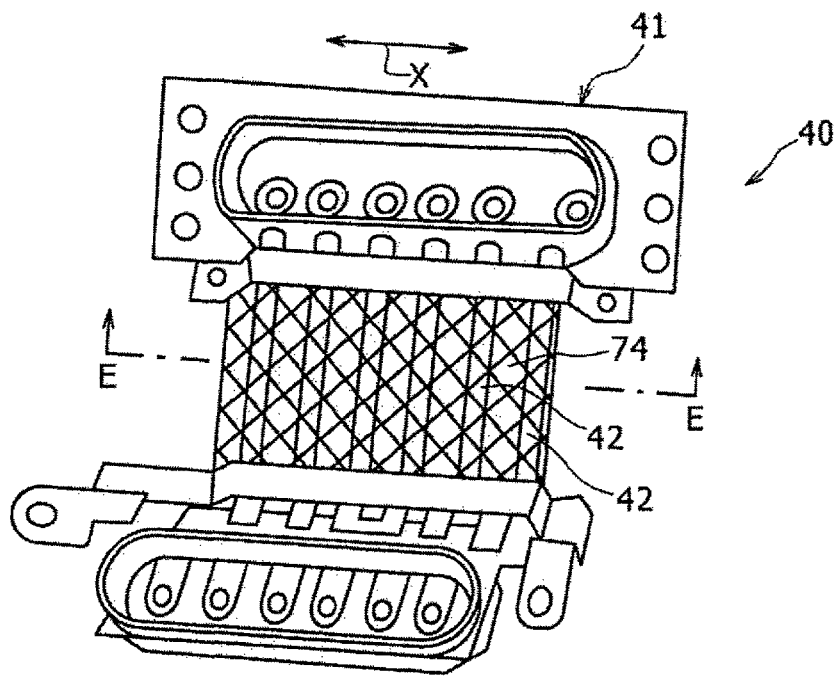
FIG. 8A A perspective view of a shielded electric wire component constituting a comparative example of the shielded electric wire connecting structure.
Figure 8B:
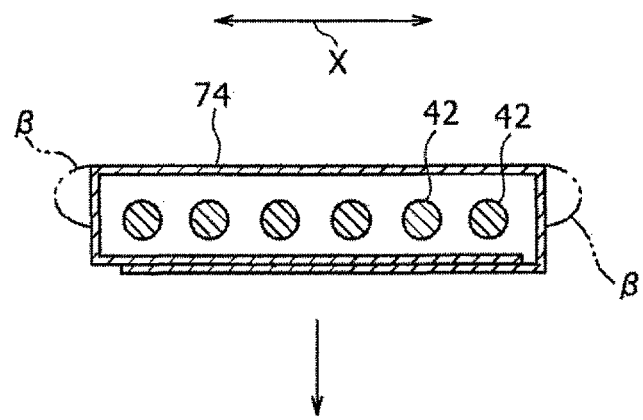
FIG. 8B A cross-sectional view taken along a line E-E indicated in FIG. 8A.
Figure 9:
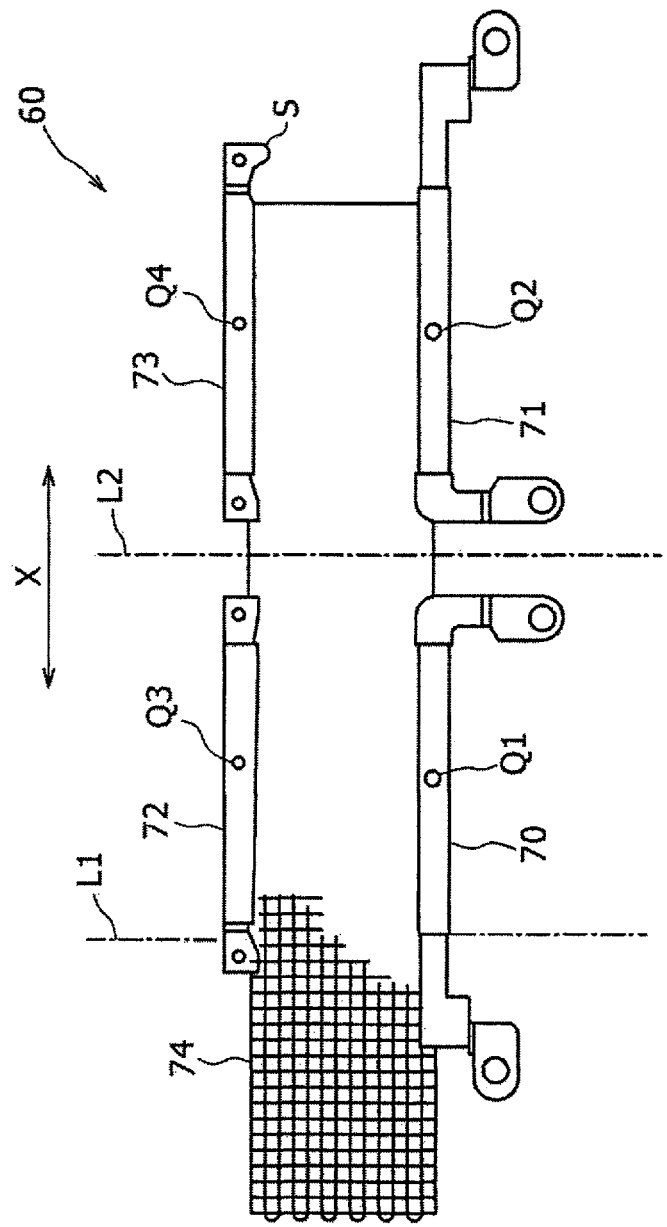
FIG. 9 A diagram showing a shield unit constituting the shielded electric wire member in FIG. 8A.

FIG. 8A is a perspective view showing another example of the shielded electric wire component 40 constituting an electric wire connecting structure, and FIG. 8B is a cross sectional view taken along a line E-E shown in FIG. 8A. FIG. 9 is a diagram showing an exploded state of the shield unit 60 constituting the shielded electric wire component 40 in FIG. 8A. In the other comparative example, the entire peripheries of the electric wires 42 arranged side by side along the x direction are covered by a braided shield component 74 formed in the shape of a sleeve. As shown in FIG. 9, the shield unit 60 includes a braided shield component 74, lower brackets 70 and 71, and upper brackets 72 and 73. The braided shield component 74 has a greater length along the lateral direction (x direction) in a state separated from the combined electric wire component 41 (FIG. 8A). Each pair of the lower brackets 70 and 71 and of the upper brackets 72 and 73 is attached to either end portion of the braided shield component 74. The braided shield component 74 is formed in the sleeve shape by folding the braided shield component 74 along, for example, chain lines L1 and L2 shown in FIG. 9. In the forming of the sleeve shape of the braided shield component 74, the two lower brackets 70 and 71 are superimposed so as to be opposed to each other, and the two upper brackets 72 and 73 are superimposed so as to be opposed to each other. In the superimposed state, a recess and a projection formed in regions on the other side from regions respectively indicated as Q1 and Q2 in FIG. 9 are fitted to each other by caulking, and a recess and a projection formed in regions on the other side from regions respectively indicated as Q3 and Q4 are fitted to each other by caulking. In this way, opposing brackets of the brackets Q1, Q2, Q3, and Q4 are joined to each other. In FIG. 9, a caulking part is formed by folding a projection S formed on one of the two upper brackets 72 and 73, i.e. the bracket 73 toward the other bracket 72. Also using the formed caulking part, the upper brackets 72 and 73 are connected to each other. In the above-described comparative example, the number of brackets, such as the brackets 70, 71, 72, and 73, is increased, and additional caulking and joining steps are introduced, which may cause an increase in cost.

Further, when the shielded electric wire component 40 in the comparative example shown in FIGS. 8A, 8B, and 9 is placed in a bent state, it is necessary for both end portions of the sleeve-shaped braided shield component 74 along the x direction to be crushingly deformed in bending portions as indicated by chain double-dashed lines β in FIG. 8B. In this regard, it is difficult to perform a bending operation along a desired direction in the comparative example. Such a disadvantage in the comparative example can be solved in the above-described embodiment.

Moreover, in the above-described embodiment, the electric wires 42 having one end connected to the lower connector 43 and the other end connected to the upper connector 47 constitute the combined electric wire component 41. In addition, the lower connector 43 is secured to the lower case 23, while the upper connector 47 is secured to the upper case 31. Further, both ends of the braided shield component 62 are connected to the lower connector 43 and the upper connector 47. In this way, the both ends of the braided shield component 62 are coupled via the lower connector 43 and the upper connector 47 to the lower case 23 and the upper case 31. This eliminates the necessity to fasten a longitudinal middle portion of the braided shield component 62 to the electric wires 42 and couple the braided shield component 62 to the lower case 23 and the upper case 31. Accordingly, the braided shield component 62 and the electric wires 42 can be easily bent in a desired direction, which can lead to further improved work efficiency in installation of the shielded electric wire component 40.

Figure 10:
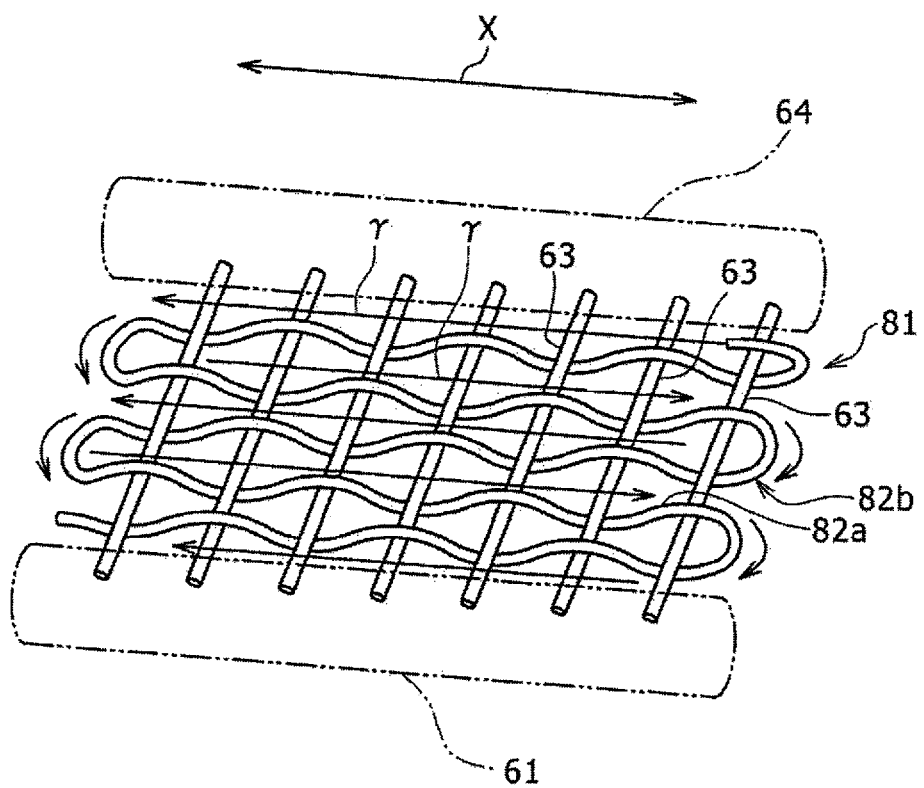
FIG. 10 A schematic diagram showing a braided shield component constituting another example of the shielded electric wire connecting structure according to the embodiment of this invention.

FIG. 10 is a schematic diagram showing a braided shield component 81 which constitutes a part of another example of the shielded electric wire connecting structure according to the embodiment. In the structure illustrated in FIGS. 1 to 7, the braided shield component 62 is formed by weaving one of the first metal wire 62b and the second metal wire 62d across the other of the metal wires 62b and 62d. On the other hand, in the structure of the other example illustrated in FIG. 10, the braided shield component 82 is extended along the electric wires 42 (see FIG. 2 and elsewhere) and connected to the upper bracket 64 and the lower bracket 61. Further, the braided shield component 81 is composed of a plurality of metal wires 63 functioning as the warp sections and a weft member 82b. The weft member 82b includes lateral sections 82a which are weft sections woven across the plurality of metal wires 63. The plurality of metal wires 63 are mutually spaced along the lateral x direction and arranged substantially parallel to each other. Each of the metal wires 63 is formed, for example, of a copper wire.

On the other hand, the weft member 82b is formed of a resin material. The resin weft member 82b has a greater tensile strength per unit cross sectional area than that obtained in a case where the weft member 82b is formed of copper. As the resin material, a specific resin material is selected in light of the greater tensile strength per unit cross sectional area of the weft member 82b. For example, nylon 66 may be selected as the resin material.

Further, the weft member 82b is woven across the plurality of metal wires 63 by means of the braiding machine (not shown in the drawing). For example, the weft member 82b is woven across the plurality of metal wires 63 along directions indicated by arrows γ in FIG. 10. At the time of weaving, a part of the weft member 82b is held, for example, by a gripper of the braiding machine and moved while being pulled along the directions of the arrows γ shown in FIG. 10. Therefore, a degree of efficiency of producing the braided shield component 81 is greatly affected by a moving speed of the weft member 82b.

In this connection, when the above weft member 82b is formed of a copper wire in the structure shown in FIGS. 1A and 1B to 7, an allowable upper limit of the moving speed of the weft member 82b will be held relatively lower due to an influence of the tensile strength of the copper wire. Because of this, there is plenty of scope for improvement in production efficiency. Although it is conceivable that the tensile strength can be increased by increasing a cross sectional area of the copper wire used for the weft member 82b, the increased cross sectional area may result in increased costs. The above-described structure according to the other example is designed with the intention of increasing the production efficiency.

In addition, a wire composed of nylon 66 (nylon wire) has a tensile strength greater than that of a copper wire whose cross sectional area is equal to the nylon wire. According to findings of the present inventors, a copper wire of 120 μm in diameter had a tensile strength of 260 cN and an elongation of 22% at breakage, while the wire formed of nylon 66 had a tensile strength of 740 cN and an elongation of 55% at breakage. Meanwhile, when nylon 66 is used for the weft member 82b, a heat resistant property of the weft member 82b can be increased. This can contribute to improved durability of the shielded electric wire connecting structure, which is advantageous in a case where the shielded electric wire connecting structure is used under a high temperature environment, such as an engine room.

In the structure according to the other example described above, the feedback paths of the noise current are created by the metal wires 63, as in the case of the structure explained with reference to FIG. 7, which means that electrical conductivity of the metal wires 63 has an influence on the effect of the braided shield component 81 for reducing externally emitted electromagnetic wave noise, while electrical conductivity of the weft member 82b has no influence on the effect. For this reason, electromagnetic wave shielding performance is not deteriorated even when a resin material is used for the weft member 82b. Further, because the resin weft member 82b has a tensile strength per unit cross sectional area greater than that of a copper weft member 82b, the resistance of the weft member 82b to a pulling force is accordingly increased. Because of this, it becomes possible to increase a speed of braiding the braided shield component 81 in a case where the weft member 82b is woven across the metal wires 63 while being pulled by the braiding machine, which can contribute to improved production efficiency. Moreover, it is also possible to reduce material costs of the weft member 82*b*. Consequently, improved strength and reduced costs of the braided shield component 81 can both be achieved without impairing the electromagnetic wave shielding performance. Components and effects other than those described above are similar to those of the structure illustrated in FIGS. 1A and 1B to 7. It should be noted that electrically conductive resin element wires may be used in place of the metal wires 63 used for forming the braided shield component 81.

Further, the structure illustrated in FIGS. 1A and 1B to 7 has been described with reference to the example in which the braided shield component is formed of the corrugated metal wire or conductive resin element wire having the plurality of longitudinal sections. Meanwhile, in the structure illustrated in FIGS. 1A and 1B to 7, a plurality of linear metal wires or conductive resin element wires formed of the longitudinal sections that function as the warp sections may be arranged substantially parallel to each other, and the weft member may be woven across the plurality of longitudinal sections to form the braided shield component. In addition, the structure illustrated in FIG. 10 has been described with reference to the example in which the braided shield component includes the metal wires 63 functioning as the plurality of warp sections arranged substantially in parallel with each other. Meanwhile, in the structure of FIG. 10, the braided shield component may be configured to include the corrugated metal wire or conductive resin element wire having the longitudinal sections functioning as the plurality of substantially parallel warp sections.

Moreover, in each of the above described examples, both ends of the electric wire may be connected to the lower terminal base 24 and the upper terminal base 34 without being fastened to the lower case and the upper case by means of the connectors 43 and 47.

REFERENCE SIGNS LIST

10 shielded electric wire connecting structure (electric wire connecting structure); 20 lower unit; 21 motor; 22 generator; 23 lower case; 23*a* screw; 24 lower terminal base; 24*a* terminal fitting; 25 bolt; 30 upper unit; 31 upper case; 31*a* plate part; 31*b* opening; 31*c* screw; 32 first inverter; 33 second inverter; 34 upper terminal base; 34*a* terminal fitting; 40 shielded electric wire component; 41 combined electric wire component; 42 electric wire; 42*a* electric wire main body; 42*b* first terminal fitting; 42*c* second terminal fitting; 42*d* conductor element wire; 42*e* insulating tube; 43 lower connector; 44 lower connector main body; 44*a* lower tube part; 46 lower fastening metal fixture; 46*a* caulking part; 47 upper connector; 48 upper connector main body; 48*a* upper tube part; 48*b* through hole; 50 upper metal plate; 51 hole; 52 lower cover; 53 upper cover; 60 shield unit; 61 lower bracket; 61*a* lower U-shaped part; 61*b*, 61*c* lower fastening member; 62 braided shield component; 62*a* longitudinal section; 62*b* first metal wire; 62*c* lateral section; 62*d* second metal wire; 63 metal wire; 64 upper bracket; 64*a* upper U-shaped part; 64*b* upper fastening member; 65 screw; 70, 71 lower bracket; 72, 73 upper bracket; 74 braided shield component; 80 bracket; 81 braided shield component; 82*a* lateral section; 82*b* weft member.

The invention claimed is:

1. A shielded electric wire connecting structure, comprising:
   a lower case that has a lower terminal base and houses a rotary electric machine;
   an upper case that has an upper terminal base and houses an inverter, the upper case being disposed directly above the lower case so as to be opposed to the lower case;
   a plurality of electric wires including first ends that are connected to the lower terminal base directly below the upper case and second ends that are connected to the upper terminal base at an end portion on a surface side of a wall of the upper case, the plurality of electric wires being placed in a state of being bent from a position directly below the upper case to a position opposed to the wall, and
   a braided shield component that is attached to the plurality of electric wires without using both the lower case and the upper case, and placed to shield the plurality of electric wires only on an opposite side of the plurality of electric wires from a face thereof opposed to the upper case.

2. The shielded electric wire connecting structure according to claim 1, wherein:
   the plurality of electric wires constitutes a combined electric wire member;
   the first ends are coupled to a lower connector, and the second ends are coupled to an upper connector;
   the lower connector is fastened to the lower case;
   the upper connector is fastened to the upper case, and
   both ends of the braided shield component are coupled to the lower connector and the upper connector.

3. The shielded electric wire connecting structure according to claim 1, wherein the upper case is composed of an electrically conductive metal, and has a rectangular box shape.

4. The shielded electric wire connecting structure according to claim 1, wherein the braided shield component comprises tin-plated annealed copper wires.

5. The shielded electric wire connecting structure according to claim 1, further comprising a U-shaped lower bracket that holds a first end of the braided shield component, and a U-shaped upper bracket that holds a second end of braided shield component.

6. The shielded electric wire connecting structure according to claim 1, wherein a lower bracket formed of an electrically conductive material is joined to a first end of the braided shield component, an upper bracket formed of an electrically conductive material is joined to a second end of the braided shield component, a lower fastening metal fixture joined to the plurality of electric wires is fastened to the lower bracket, an upper metal plate joined to the plurality of electric wires is joined to the upper bracket, the upper metal plate is fastened to the upper case, and the lower bracket is fastened to the lower case.

7. A shielded electric wire connecting structure, comprising:
   a lower case that has a lower terminal base and houses a rotary electric machine;
   an upper case that has an upper terminal base and houses an inverter, the upper case being disposed directly above the lower case so as to be opposed to the lower case;
   a plurality of electric wires including first ends that are connected to the lower terminal base directly below the upper case and second ends that are connected to the upper terminal base at an end portion on a surface side of a wall of the upper case, the plurality of electric wires being placed in a state of being bent from a position directly below the upper case to a position opposed to the wall, and a braided shield component that is placed to shield the plurality of electric wires only on an opposite side of the plurality of electric wires from a face thereof opposed to the upper case; wherein the braided shield component comprises a plurality of warp sections, which have electrical conductivity and extend along the plurality of electric wires so as to be connected to a first fastening member, formed of an electrically conductive material and fixed to the upper case, and a second fastening member, formed of an electrically conductive material and fixed to the lower case, and a weft member, which is formed of a resin material and woven across the plurality of warp sections while intersecting each other, and the weft member has a tensile strength per unit cross sectional area higher than that of a weft member formed of copper.

* * * * *